Nov. 18, 1958     P. W. JACOBSEN ET AL     2,860,840
REMOTE CONTROL EDGE ALIGNMENT DEVICE
Filed Aug. 12, 1952                  3 Sheets-Sheet 1
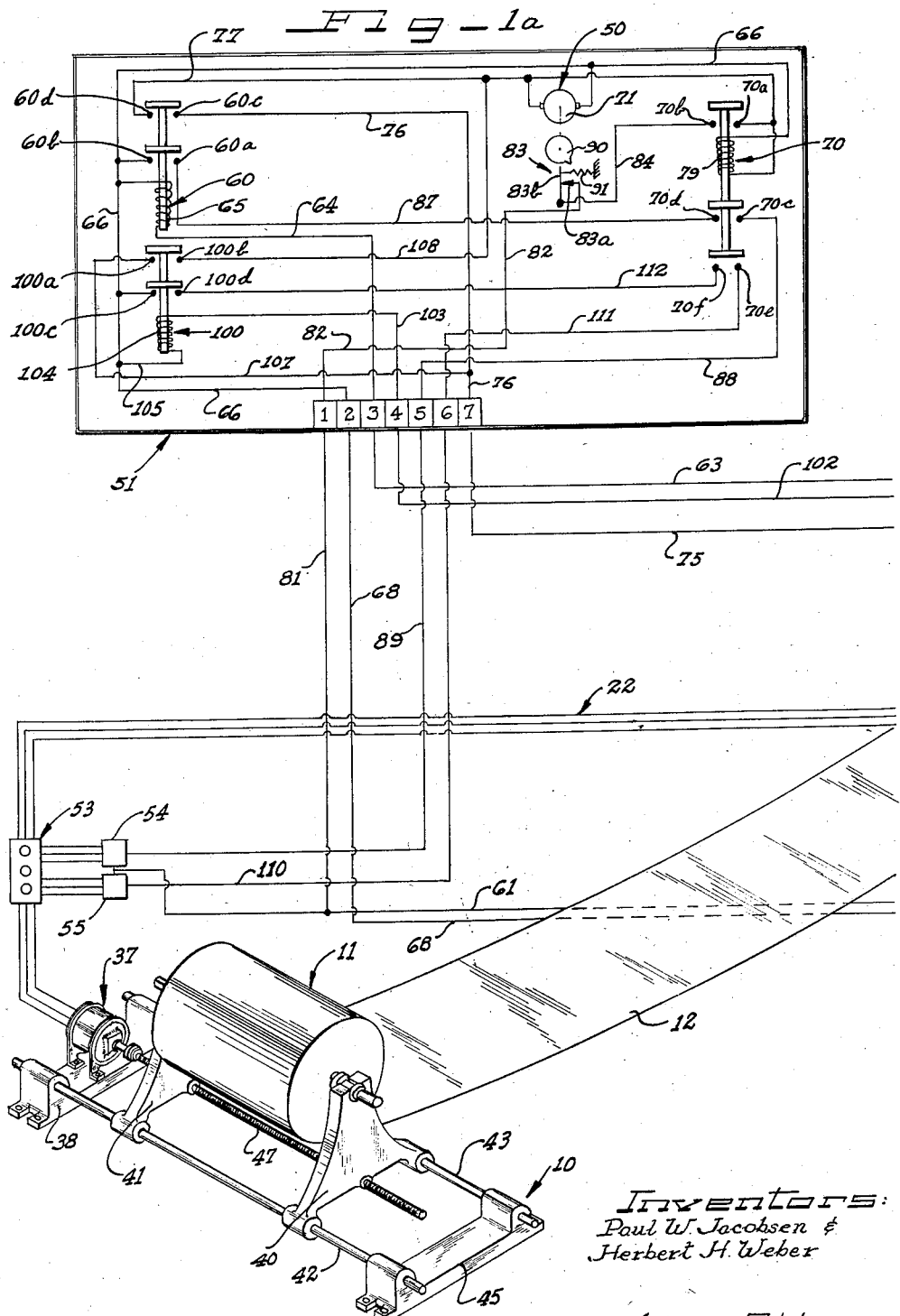
Inventors:
Paul W. Jacobsen &
Herbert H. Weber
by Hill, Sherman, Meroni, Gross & Simpson Attys Nov. 18, 1958  P. W. JACOBSEN ET AL  2,860,840
REMOTE CONTROL EDGE ALIGNMENT DEVICE
Filed Aug. 12, 1952  3 Sheets-Sheet 2

Inventors:
Paul W. Jacobsen &
Herbert H. Weber by Hill, Sherman, Meroni, Gross & Simpson  Attys Nov. 18, 1958 P. W. JACOBSEN ET AL 2,860,840
REMOTE CONTROL EDGE ALIGNMENT DEVICE
Filed Aug. 12, 1952 3 Sheets-Sheet 3
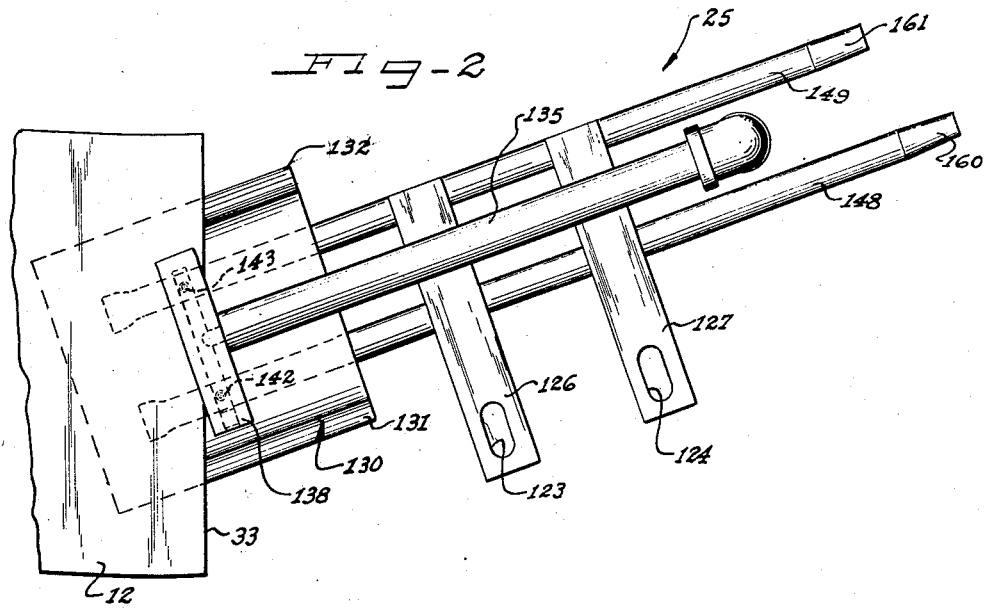
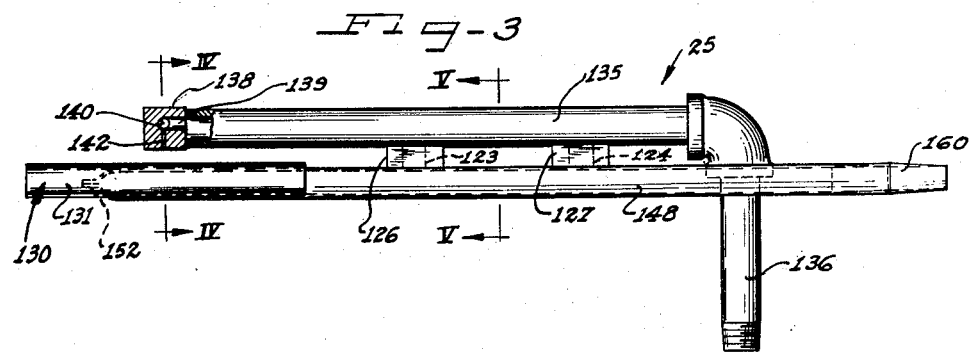
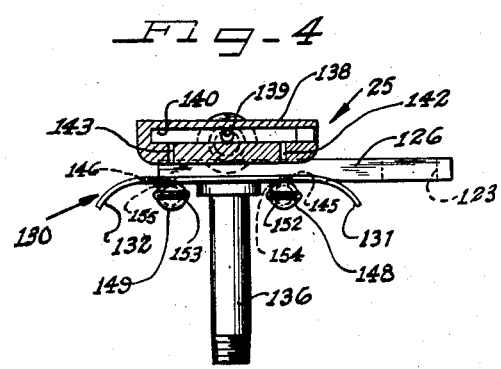
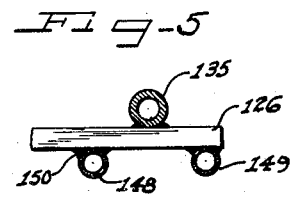
Inventors:
Paul W. Jacobsen &
Herbert H. Weber
by Hill, Sherman, Meroni, Gross & Simpson Attys United States Patent Office 2,860,840
Patented Nov. 18, 1958

2,860,840

REMOTE CONTROL EDGE ALIGNMENT DEVICE

Paul W. Jacobsen, Kiel, and Herbert H. Weber, Sheboygan, Wis., assignors to H. G. Weber & Company, Kiel, Wis., a corporation of Wisconsin Application August 12, 1952, Serial No. 304,038

3 Claims. (Cl. 242—57.1)

This invention relates to an automatic edge alignment device, and more particularly to a device for automatically aligning the edge of web material at a point remote from the roll from which the material is unwound.

The present invention has particular use in paper converting operations such as, laminating, waxing, coating, printing and the like. For example, in multi-wall paper bag machinery, the unwinding roll stand may be many feet away from the particular point of operation, e. g. 20 ft. to 100 ft. On one installation, for example, the unwinding roll stand in the farthest out position on a multi-wall tuber operaton handling crinkled kraft was 42 ft. from the tuber. In such a case, it has been found that the web may be misaligned at the tuber as much as 8 inches. By placing an operator in constant care of the two farthest out unwinding stands, he was able manually to align the web to an accuracy of about ½ inch. By the use of a remote control edge alignment device according to the present invention, it has been found that the alignment at the tuber can be controlled to ⅛ inch with no attention from an operator.

It is, therefore, an important object of the present invention to provide an edge alignment device which will operate automatically and with considerable accuracy.

It is a further object of the present invention to provide an automatic edge alignment device which is operative to align the edge of a web at a remote station.

It is a further object of the present invention to provide an edge alignment device which is particularly suited to unruly webs having long spans between the unwinding rolls and the converting operations.

It is a further important object of the present invention to provide a novel remote control edge alignment circuit for a roll stand.

It is a still further object of the present invention to provide a novel edge alignment system.

It is still a further object of the present invention to provide a novel method and means for controlling the transverse position of travelling elongated sheet material.

Other objects, features and advantages of the present invention will be readily apparent from the following detailed description of a preferred embodiment thereof taken in conjunction with the accompaying sheets of drawings, in which:

On the drawings:

Figure 1a is a schematic, perspective view of a roll stand with a wiring diagram of the associated control circuit according to the present invention;

Figure 2 is a partial top plan view of the edge misalignment detector in operative relation to an edge of the web;

Figure 3 is a side elevational view of the edge misalignment detector with a portion thereof broken away and in section;

Figure 4 is a transverse sectional view taken substantially along the line IV—IV of Figure 3; and Figure 5 is a transverse sectional view taken substantially along the line V—V of Figure 3.

As shown on the drawings:

Figure 1B:
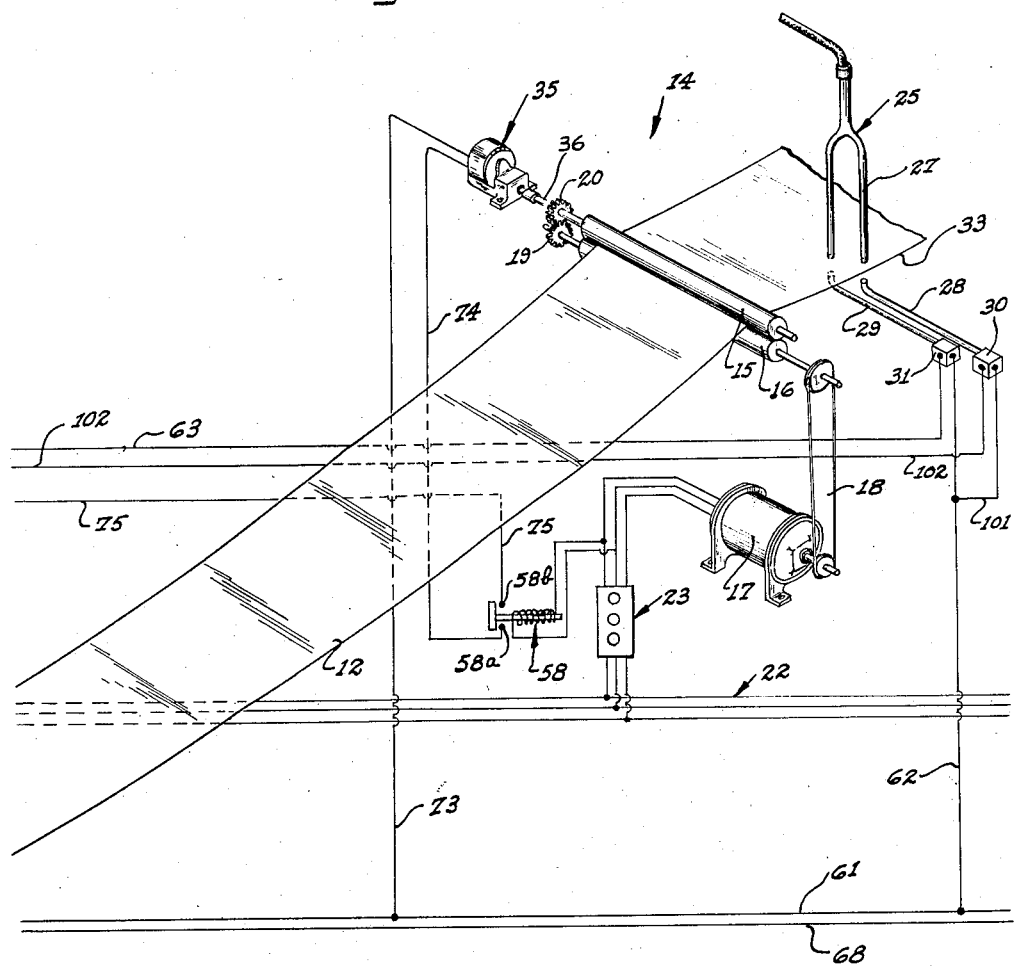
Figure 1b is a schematic, perspective view constituting a continuation to the right of Figure 1a and illustrating the converting station and associated control circuit according to the present invention.

In the drawings, the roll stand 10 is indicated more or less diagrammatically and may actually comprise any suitable conventional roll stand having means for shifting a roll 11 carried thereby in either lateral direction. The roll 11 may comprise an elongated web 12 which is to undergo a converting operation, such as a multi-wall tuber operation, laminating, corrugating, waxing, coating, printing and the like at a remote station 14. In such converting operations, it will be understood that it is desirable that the edge of the web 12 be maintained in a certain lateral position or within a certain range of lateral positions at the converting station. For purposes of illustration, it is assumed that the rolls 15 and 16, Figure 1b, represent driven rolls on the converting apparatus and that it is desired to maintain the edge of the web at the general transverse position indicated in Figure 1b. A motor 17 is illustrated as driving the rolls 15 and 16 through a belt 18 and through cooperating gears 19 and 20 at the opposite end of the rolls from the pulley drive 18. The motor 17 is energized from three-phase line 22 through a manual control box 23.

An edge misalignment detector 25 is utilized at the converting station to generate an electrical signal whenever the edge of the web is out of its pre-selected lateral position. This electrical signal is utilized in conjunction with a control circuit to be hereinafter described to shift the roll 11 on the roll stand 10 at spaced intervals in a direction to correct for the error in alignment.

In the embodiment illustrated, this misalignment detector is schematically indicated as comprising a forked tube 27 for directing air toward a pair of pickup tubes 28 and 29, which tubes are operatively connected with air switches 30 and 31. The air switch 30 may be constructed to maintain a pair of contacts open as long as the air jet from the fork 27 is received in the pickup tube 28, while the air switch 31 may be constructed to maintain its electrical contacts open so long as no air jet is picked up by the tube 29 from the fork 27. Thus, with the edge 33 of the web 12 interposed between the fork 27 and the pickup tube 29, but not interposed between the pickup tube 28 and the fork, the contacts of both switches 30 and 31 will be open.

It will be appreciated that the edge misalignment detector may utilize a pair of light beams and cooperating photoelectric cells or other suitable means in place of the air pressure detector illustrated.

As will hereinafter be described, the control circuit including the switches 30 and 31 is so arranged as to move the roll 11 to the left at intervals so long as the edge 33 interrupts the stream of air to the pickup tube 28, and to move the roll 11 to the right at intervals so long as the edge 33 fails to interrupt flow from the fork 27 to the pickup 29. Control is accomplished by shifting the roll laterally in the proper direction for a short distance, as for example ⅛ in. to ¼ in. After each lateral shifting of the roll, an interval may be provided to allow the portion of the web leaving the roll after the correction increment to reach the converting station. In this case, after each correction, the position of the roll is not again corrected until the effect of that correction can be detected by the edge misalignment detector 25.

However, corrections can be applied at shorter intervals. When the web is unsupported from the roll stand to the converting operation, it will be appreciated that any shifting of the roll stand is almost immediately effective to shift the position of the web at the converting operation. Under such circumstances, it may be advantageous to shorten the intervals at which correction is permitted. The interval can be shortened so that a portion unwinding from the roll 11 at the end of a correction will travel only ¾ or ½ the distance to the converting operation before a further correction is applied.

In the present embodiment, this interval between corrections is imposed by means of a footage control switch 35. The manner in which the footage control switch cooperates with the other elements of the control system will be hereinafter described. It will be understood that the footage-type measuring device is preferable to a timer for determining correction intervals where the speed of the converting operation will vary considerably and it is desired to apply a correction after a uniform amount of travel of the web. When the interval between corrections is determined by means of a timer, it would be desirable to install a centrifugal switch at the converting operation which would open the automatic edge aligning circuit when the converting operation slows down too much so as to prevent over-control of the web.

Referring to Figure 1a, it will be seen that the lateral adjustment of the roll 11 is accomplished by means of a reversible motor 37 mounted on a base member 38 on the roll stand 10. A pair of cradle members 40 and 41 are mounted on guide rods 42 and 43 extending between the base member 38 and a base member 45 of the roll stand 10. The motor 37 is illustrated as driving a screw 47 which threadedly engages the cradle members 40 and 41 and moves them to the left or right, depending on the direction of rotation of the motor 37.

The amount of lateral distance that the roll 11 is moved for each correction signal from detector 25 is controlled by means of a timer 50 of the motor control circuit 51. For example, lateral adjustments of ⅛ in. to ¼ in. may be obtained for each air signal transmitted to the motor control circuit 51 by setting the timer to energize the motor for from two to four seconds per signal.

The motor 37 may be energized from the three-phase line 22 under the control either of a manual control box 53, or left and right automatic control solenoid starters 54 and 55, respectively. For automatic remote edge alignment, the automatic control solenoid starters 54 and 55 are controlled by the motor control circuit 51 which in turn is actuated during a correction interval determined by the footage control switch 35, providing the edge is out of alignment during such correction interval.

To prevent correction signals from the misalignment detector 25 from acting on the motor 37 when the converting operation has been stopped, a lock relay 58 is provided which will open when the converting motor 17 is deenergized to disconnect the interval control device 35 from the motor control circuit 51. Thus, even if the converting operation should be stopped at a point where the footage control switch were closed, no correction signals would reach the motor control circuit.

The electrical control system for the roll stand will be now readily understood.

*Correction of roll when web edge has moved to the left*

If the edge 33 of the web 12 moves to the left of the neutral zone between the tubes 28 and 29, air will flow from the fork 27 into both tubes 28 and 29, flow of air in the tube 29 serving to close the air switch 31. The left-hand relay 60 in the motor control circuit 51 is then energized through the following circuit: Control circuit supply conductor 61, Fig. 1b, conductor 62, closed air switch 31, conductor 63, terminal position No. 3, conductor 64, winding 65 of relay 60, conductor 66, terminal position No. 2, and control circuit supply conductor 68.

The relay 60 is then operative to close contacts 60a and 60b, and 60c and 60d, but no further operation is obtained until the footage control switch 35 closes.

If now, the selected footage of the web has passed through the converter station 14, the footage control switch 35 will close momentarily. If the edge 33 is still misaligned at this time, the timer relay 70 and timer motor 71 are energized in parallel through the following circuit: Control circuit supply conductor 61, conductor 73, footage control switch 35, conductor 74, contacts 58a and 58b of locking relay 58, conductor 75, position No. 7 of the terminal strip, conductor 76, contacts 60c and 60d of relay 60, conductor 77, timer motor 71 and relay coil 79 in parallel, conductor 66, terminal No. 2 and control circuit supply conductor 68.

Closure of relay 70 closes contacts 70a and 70b, 70c, 70d, 70e and 70f.

Since the footage control switch 35 closes only momentarily, a holding circuit is provided for maintaining energization of coil 79 of the relay 70 and for maintaining energization of timer motor 71 under the control of contacts 83a, 83b of the timer 50. The holding circuit is opened by the timer 50 after a predetermined number of seconds so as to limit the amount of correction applied to the roll 11 by the motor 37. The holding circuit for the relay 70 is as follows: Supply conductor 61, conductor 81, terminal No. 1, conductor 82, stationary contact 83a and movable contact arm 83b of timer switch 83, conductor 84, contacts 70b and 70a of relay 70, relay coil 79 of relay 70, conductor 66, terminal position No. 2 and supply conductor 68.

The left automatic control solenoid starter 54 is now energized through the relay 70 to allow the motor 37 to move the roll 11 to the right to correct for the left error detected at the converting station. The energizing circuit for the solenoid 54 is as follows: Supply conductor 68, terminal position No. 2, conductor 66, contacts 60b and 60a of relay 60, conductor 87, contacts 70d and 70c of relay 70, conductor 88, terminal position No. 5, conductor 89, control solenoid 54 and supply conductor 61.

After a predetermined number of seconds, the timer cam 90 opens the switch 83 against the action of the spring 91 to break the holding circuit for the relay 70 and thus deenergize the control solenoid 54 to stop the motor.

*Correction of the roll when web edge has moved to the right*

When the web moves to the right at the converting station 14 to interrupt both streams of air from fork 27, the air switch 30 closes its contacts to energize the right-hand motor control relay 100 through the following circuit: Control circuit supply conductor 61, conductor 62, conductor 101, air switch 30, conductor 102, position No. 4 on the terminal strip, conductor 103, coil 104 of relay 100, conductor 105, conductor 66, position No. 2, and conductor 68.

The interval control switch 35 is driven by means of a shaft 36 connected with gear 20 and roll 15 as shown in Fig. 1b. Switch 35 momentarily closes each time a predetermined number of revolutions of shaft 36 has taken place corresponding to a predetermined length of web traveling between rollers 15 and 16. Switch 35 when closed completes a circuit through the coil 79 of relay 70 and through the timer motor 71 in parallel. The energizing circuit for these elements is as follows: Supply conductor 61, conductor 73, footage control switch 35, conductor 74, contacts 58a and 58b of locking relay 58, conductor 75, position No. 7, conductor 76, conductor 107, contacts 100a and 100b of relay 100, conductor 108, conductor 77, through timer motor 71 and coils 79 of relay 70 in parallel, conductor 66, position No. 2, and supply conductor 68.

The holding circuit for the relay 70 extends as previously through the switch 83 of the timer 50. The energizing circuit for the right control solenoid 55 for the motor 37 is as follows: Supply conductor 61, right automatic control starter solenoid 55, conductor 110, position No. 6, conductor 111, contacts 70e and 70f of relay 70, conductor 112, contacts 100d and 100c of relay 100, conductor 66, position No. 2 and supply conductor 68.

The roll 11 is now moved to the left by the motor 37 until the timer 50 interrupts the holding circuit for the relay 70 as previously.

By way of example, an air pressure detector structure has been illustrated in Figures 2 through 5. As illustrated in Figure 2, the structure is adapted to be mounted on a suitable support (not shown) at an angle to the edge 33 of the web 12 by means of slots 123 and 124 of mounting arms 126 and 127. The web is adapted to travel over a plate 130 having downwardly curved leading and trailing edges 131 and 132, respectively. Air under pressure is supplied to the center pipe 135 carried by the arms 126 and 127 from the inlet pipe 136, Figure 2. At the end of the inlet pipe 135 overlying the guide plate 130, is a transverse divider block 138 having an inlet passage 139, Figure 2, communicating with the center pipe 135 and having a transverse passageway 140 for distributing incoming air to spaced downwardly directed outlets 142 and 143. These outlet jets are disposed directly over apertures 145 and 146 in the guide plate 130. A pair of pickup tubes 148 and 149 are likewise carried by the support arms 126 and 127 and extend beneath the guide plate 130 and are welded thereto as indicated at 150. These tubes have pinched ends 152 and 153 and have apertures 154 and 155 aligned with the apertures 145 and 146 in the guide plate 130 for picking up air from the outlet ports 142 and 143. Air under pressure from the delivery pipe 135 will thus travel into the pickup pipes and through the outlet ends 160 and 161 to which may be attached suitable air switches of any conventional design (not shown).

It will be apparent from Figure 2, that by shifting the position of the arms 126 and 127 relative to their support, the transverse separation between the outlet ports 142 and 143 relative to the web edge 33 can be increased and decreased as desired to adjust the detector to respond to any desired deviation of the web edge from its pre-selected central position, the detector being clamped in any desired position by means of the bolts (not shown).

SUMMARY OF OPERATION

Once the web 12 has been unwound from the roll 11 and threaded through the drive rollers 15 and 16 and in operative relation to the edge misalignment detector 25, motor 17 may be energized by means of control box 23 to rotate rolls 15 and 16 and advance the web 12 through the machine. At the same time, footage control switch 35 is driven by means of shaft 36 to close its contacts momentarily each time a predetermined length of the web 12 has moved through the rollers 15 and 16. So long as the edge 33 of the web 12 remains intermediate the air jets from the fork 27, both switches 30 and 31 will be open. If the web deviates to the left as viewed in Fig. 1b, switch 31 will be closed, while if the web deviates to the right, switch 30 will be closed. If switch 30 is closed, relay 100 will be energized, while if switch 31 is closed, relay 60 will be energized.

If either relay 60 or 100 is energized indicating edge misalignment, when footage control switch 35 momentarily closes, relay 70 will be energized. Once energized, relay 70 is maintained energized by means of a holding circuit including contacts 70a and 70b and normally closed contacts 83a and 83b of timer 50. Timer motor 71 is also maintained energized by means of this holding circuit. When relay 70 is energized, either solenoid starter 54 or 55 will be energized depending upon whether relay 60 or 100 has been energized. Solenoid starter 54 when energized causes shifting of the roll 11 in one direction by the motor 37, while solenoid 55 causes the motor 37 to shift the roll in the opposite direction, the direction of shifting of the roll being such as to correct the error indicated by switch 30 or 31. When timer 50 completes its timing cycle, the holding circuit for relay 70 will be interrupted at contacts 83a and 83b to deenergize relay 70 and timer motor 71.

Since the timer 50 controls the length of time during which the motor 37 is energized, it limits the amount of correction applied to the roll 11 during each closure of the footage control switch 35.

It will be understood that modifications and variations may be effected without departing from the scope of the novel concepts of the present invention.

We claim as our invention:

1. A web position control system comprising shifting means for shifting a roll in opposite directions to adjust the lateral position of a web unwinding therefrom, means controlling the direction of shifting of said shifting means to require shifting of the roll in a direction to correct for a deviation of the web from a desired position, a timer relay controlling actuation of said shifting means when a correction is indicated by said direction controlling means, an interval control switch controlling actuation of said timer relay, means for momentarily actuating said interval control switch at spaced intervals to actuate said timer relay, means for maintaining said timer relay in actuated condition after momentary actuation and subsequent deactuation of said interval control switch, and timer means controlling said maintaining means and actuated by the momentary actuation of said interval control switch to initiate a timing cycle, said timer means being operative to deactuate said timer relay at the end of a predetermined period to terminate a correction cycle, and said direction controlling means controlling the direction of shifting of the roll by the shifting means during a correction cycle.

2. An edge alignment assembly comprising a roll stand for rotatably mounting a roll of web material, a station remote from said roll stand for receiving web material unwound from said roll on said roll stand, reversible motor means for shifting said roll in opposite lateral directions, first motor control means for energizing said motor means to shift said roll in a first lateral direction, second motor control means for energizing said motor means to shift said roll in the opposite lateral direction, a first motor control energizing circuit for said first motor control means, a second enabling relay having contacts for said second motor control means, a timer relay having contacts in said first motor control energizing circuit and in said second motor control energizing circuit and having a coil which when energized causes said contacts to be closed, a first enabling relay having contacts in said first motor control energizing circuit for said first motor control means, a second motor control energizing circuit for said second motor control means, a first edge sensing device at said station for detecting misalignment of an edge of the web material in one lateral direction, a second edge sensing device for detecting misalignment of said edge in the opposite lateral direction, a first switch controlled by said first edge sensing device, a second switch controlled by said second edge sensing device, a first enabling relay energizing circuit for said first enabling relay controlled by said first switch, a second enabling relay energizing circuit for said second enabling relay controlled by said second switch, an interval control switch controlling energization of the coil of said timer relay, means for actuating said interval control switch at spaced intervals, a holding circuit for the coil of said timer relay including a normally open contact of said timer relay for maintaining said timer relay energized once said timer relay has been energized under the control of said interval control switch, and a timer device comprising a timer motor connected in parallel with said coil of said timer relay and a pair of normally closed contacts in said holding circuit which are opened after a predetermined period of energization of said timer motor for deenergizing said timer relay and said timer motor after said predetermined period has elapsed.

3. An edge alignment assembly comprising a roll stand for rotatably mounting a roll of web material, a station remote from said roll stand for receiving web material unwound from said roll on said roll stand, reversible motor means for shifting said roll in opposite lateral directions, first motor control means for energizing said motor means to shift said roll in a first lateral direction, second motor control means for energizing said motor means to shift said roll in the opposite lateral direction, a first motor control energizing circuit for said first motor control means, a second motor control energizing circuit for said second motor control means, a timer relay having contacts in said first motor control energizing circuit and in said second motor control energizing circuit and having a coil which when energized causes said contacts to be closed, a first timer relay energizing circuit for said coil of said timer relay, a second timer relay energizing circuit for said coil of said timer relay, a first enabling relay having contacts respectively in said first motor control and timer relay energizing circuits, a second enabling relay having contacts respectively in said second motor control and timer relay energizing circuits, a first edge sensing device at said station for detecting misalignment of an edge of the web material in one lateral direction, a second edge sensing device for detecting misalignment of said edge in the opposite lateral direction, a first switch controlled by said first edge sensing device, a second switch controlled by said second edge sensing device, a first enabling relay energizing circuit for said first enabling relay controlled by said first switch, a second enabling relay energizing circuit for said second enabling relay controlled by said second switch, an interval control switch controlling both said first and second timer relay energizing circuits for said timer relay and having a pair of normally open interval control contacts in said first and second timer relay energizing circuits which are momentarily closed at spaced intervals, means responsive to the length of web material traveling past said station for momentarily closing said interval control contacts each time a predetermined length of said web material travels past said station, a holding circuit for the coil of said timer relay including a normally open contact of said timer relay for maintaining said timer relay energized after opening of the interval control contacts of said interval control switch once said timer relay has been energized, and a timer device comprising a timer motor connected in parallel with said coil of said timer relay and having a pair of normally closed contacts in said holding circuit which are opened after a predetermined period of energization of said timer motor for deenergizing said timer relay and said timer motor after said predetermined period has elapsed.

References Cited in the file of this patent

UNITED STATES PATENTS

| | | |
|---|---|---|
| 2,037,086 | Nash | Apr. 14, 1936 |
| 2,078,669 | King | Apr. 27, 1937 |
| 2,114,716 | Kunzle | Apr. 19, 1938 |
| 2,178,231 | Hetherington | Oct. 31, 1939 |
| 2,250,053 | Stowell | July 22, 1941 |
| 2,294,996 | Mercier | Sept. 8, 1942 |
| 2,491,636 | Amos | Dec. 20, 1949 |
| 2,539,131 | Gundersen et al. | Jan. 23, 1951 |
| 2,687,885 | Kroth | Aug. 31, 1954 |